US010427252B2

(12) United States Patent
Ambring (10) Patent No.: US 10,427,252 B2
(45) Date of Patent: Oct. 1, 2019

(54) ERGONOMIC WELDING ARM WITH A PLURALITY OF ARM LINKS AND JOINTS

(71) Applicant: ESAB AB, Gothenburg (SE)

(72) Inventor: Josefin Ambring, Gothenburg (SE)

(73) Assignee: ESAB AB, Gothenburg (SE)

( * ) Notice: Subject to any disclaimer, the term of this patent is extended or adjusted under 35 U.S.C. 154(b) by 143 days.

(21) Appl. No.: 15/307,673

(22) PCT Filed: May 9, 2014

(86) PCT No.: PCT/IB2014/061345
§ 371 (c)(1),
(2) Date: Oct. 28, 2016

(87) PCT Pub. No.: WO2015/170146
PCT Pub. Date: Nov. 12, 2015

(65) Prior Publication Data
US 2017/0050273 A1    Feb. 23, 2017

(51) Int. Cl.
*B23K 37/02* (2006.01)
*B23K 9/28* (2006.01)
*B23K 9/32* (2006.01)
*B23K 9/12* (2006.01)

(52) U.S. Cl.
CPC .......... *B23K 37/0205* (2013.01); *B23K 9/124* (2013.01); *B23K 9/287* (2013.01); *B23K 9/32* (2013.01); *B23K 37/02* (2013.01)

(58) Field of Classification Search
CPC ..... B23K 9/287; B23K 9/124; B23K 37/0205
USPC ............... 219/137.31, 73.2, 137.41, 125.1
See application file for complete search history.

(56) References Cited

U.S. PATENT DOCUMENTS

| 2,818,494 | A | * | 12/1957 | Bernard | B23K 9/287 219/125.1 |
| 4,014,495 | A | * | 3/1977 | Oda | B23K 9/032 219/119 |
| 4,629,860 | A | * | 12/1986 | Lindbom | B23K 9/287 219/125.1 |
| 4,677,273 | A | * | 6/1987 | Colegrove | B23K 15/00 219/121.13 |

(Continued)

FOREIGN PATENT DOCUMENTS

| CN | 1745953 A | 3/2006 |
| CN | 101065810 A | 10/2007 |

(Continued)

OTHER PUBLICATIONS

Notice of Preliminary Rejection for corresponding Korean patent application 10-2016-7034402, dated Mar. 30, 2018, 8 pages.

(Continued)

*Primary Examiner* — Jimmy Chou
(74) *Attorney, Agent, or Firm* — Edell, Shapiro & Finnan, LLC (57) ABSTRACT

An ergonomic welding arm (1) includes a plurality of arm links (14, 20, 24) coupled by a plurality of joints (12, 18, 22). Each of the plurality of joints (12, 18, 22) is configured to allow the plurality of arm links (14, 20, 24) to be rotated about an axis with respect to a directly adjacent arm link (14, 20, 24). A first end of the welding arm (1) is configured to engage a support (4) for supporting the welding arm (1). A second end of the welding arm (1) is configured to engage a welding torch (10).

19 Claims, 7 Drawing Sheets

(56) References Cited

U.S. PATENT DOCUMENTS

| | | | | |
|---|---|---|---|---|
| 5,086,206 A * | 2/1992 | Hansen | B23K 9/287 | 219/125.1 |
| 5,968,384 A * | 10/1999 | Willems | B23K 37/0435 | 219/125.1 |
| 6,107,601 A * | 8/2000 | Shimogama | B23K 9/1037 | 219/130.01 |
| 6,150,632 A * | 11/2000 | Fisher | B23K 9/1336 | 219/137.71 |
| 6,274,839 B1 * | 8/2001 | Stone | B23K 9/04 | 219/125.1 |
| 6,392,190 B1 * | 5/2002 | Sue | B23K 9/287 | 219/121.59 |
| 6,617,544 B1 * | 9/2003 | Tsukamoto | B23K 26/08 | 219/121.79 |
| 8,231,045 B2 * | 7/2012 | Lagerkvist | B23K 37/0229 | 219/124.1 |
| 8,260,443 B2 * | 9/2012 | Ehlerding | G05B 19/402 | 219/121.79 |
| 8,399,809 B1 * | 3/2013 | Bourez | C23C 14/541 | 219/388 |
| 8,552,330 B2 * | 10/2013 | Mate | B23K 9/324 | 219/137.41 |
| 10,046,421 B2 * | 8/2018 | Andersen | B23K 37/0282 | |
| 2004/0084430 A1 * | 5/2004 | Hanzel | A41D 19/01529 | 219/132 |
| 2005/0103768 A1 * | 5/2005 | Ward | B23K 9/10 | 219/132 |
| 2005/0189333 A1 * | 9/2005 | Nakagiri | B25J 19/0029 | 219/125.1 |
| 2006/0000817 A1 * | 1/2006 | Inoue | B23K 9/1336 | 219/125.1 |
| 2006/0021264 A1 * | 2/2006 | Grobenstieg | E02F 3/38 | 37/444 |
| 2006/0037947 A1 * | 2/2006 | Schneider | H05H 1/34 | 219/121.48 |
| 2006/0049159 A1 * | 3/2006 | Nihei | B23K 9/1336 | 219/137.9 |
| 2007/0017911 A1 * | 1/2007 | Mishima | B23K 9/1333 | 219/125.1 |
| 2007/0040527 A1 * | 2/2007 | Cardinale | G05B 19/19 | 318/575 |
| 2007/0131664 A1 * | 6/2007 | Fisher | B23K 9/32 | 219/136 |
| 2008/0041834 A1 * | 2/2008 | Nishimura | B23K 9/0671 | 219/125.1 |
| 2008/0149608 A1 * | 6/2008 | Albrecht | B23K 9/0956 | 219/130.1 |
| 2009/0242535 A1 * | 10/2009 | Minato | B23K 9/133 | 219/137.31 |
| 2009/0321403 A1 * | 12/2009 | Brenneke | B23K 9/321 | 219/137.41 |
| 2010/0111656 A1 * | 5/2010 | Mezera | B65F 3/041 | 414/408 |
| 2010/0140240 A1 * | 6/2010 | Turner | B23K 9/127 | 219/124.4 |
| 2010/0314369 A1 * | 12/2010 | Kaufman | B23K 9/1087 | 219/130.1 |
| 2011/0011835 A1 * | 1/2011 | Mate | B23K 9/186 | 219/73.2 |
| 2011/0114617 A1 * | 5/2011 | Gelmetti | B23K 9/1336 | 219/137.9 |
| 2012/0199559 A1 * | 8/2012 | Mate | B23K 9/186 | 219/73 |
| 2013/0119032 A1 * | 5/2013 | Lipnevicius | B23K 37/02 | 219/124.1 |
| 2013/0193126 A1 * | 8/2013 | Anderson | B65H 51/10 | 219/137.2 |
| 2013/0240496 A1 * | 9/2013 | Kinder | B23K 9/323 | 219/138 |
| 2015/0076131 A1 * | 3/2015 | Terada | B23K 9/133 | 219/137.63 |
| 2016/0151833 A1 * | 6/2016 | Tsao | B23K 9/04 | 65/60.1 |

FOREIGN PATENT DOCUMENTS

| | | |
|---|---|---|
| CN | 102717384 A | 10/2012 |
| EP | 1632304 A1 | 3/2006 |
| GB | 1526248 A | 9/1978 |
| JP | H11-77382 A | 3/1999 |
| JP | 2002-239747 A | 8/2002 |
| JP | 2002239747 A | 8/2002 |
| JP | 2003-275873 A | 9/2003 |
| JP | 2006015360 A | 1/2006 |
| JP | 2013-121617 A | 6/2013 |
| JP | 5244166 A | 7/2013 |
| KR | 20-1999-0010035 | 3/1999 |
| KR | 2012-0000989 A | 1/2012 |

OTHER PUBLICATIONS

International Search Report and Written Opinion dated Feb. 5, 2015 for PCT Application PCT/IB2014/061345 filed May 9, 2014.

Notification of First Office Action for Chinese patent application No. 201480078717.6 dated May 21, 2018 with translation, 16 pages.

KIPO's Notice of Preliminary Rejection with English translation for Korean Patent Application No. 10-2016-7034402 dated Dec. 24, 2018, 11 pages.

Notification of the Second Office Action for Chinese patent application No. 201480078717.6 dated Feb. 11, 2019 with translation, 15 pages.

* cited by examiner

ERGONOMIC WELDING ARM WITH A PLURALITY OF ARM LINKS AND JOINTS

FIELD OF THE DISCLOSURE

The disclosure generally relates to welding equipment, and more particularly to an ergonometric welding arm for use with manual welding equipment.

BACKGROUND OF THE DISCLOSURE

The most well-known issues among welders today are caused by the welding cable and the welding torch. The welding cable and welding torch together cause numerous problems due to their weight and inflexibility. Typically the whole cable (or part of the cable) is positioned below the elbow height of the welder, which forces the welder to carry the entire weight of the cable during welding. The welder has to compensate the weight of it with the wrist, back and shoulders. In addition, the connection between the torch and the cable is very inflexible. The torch connection thus creates a leverage effect, forcing the welder's wrist into unnatural postures. As a result, the torch and cable cause fatigue to the body in excess of what is desirable.

The welding cables can also be dangerous when they are laid on the floor, creating risk for stumbling. In addition, the welding cable can snag on objects in the surroundings as it is being moved to follow a particular weld path. This can result in a broken weld which may cause the welder to start the weld over, thereby reducing efficiency.

Further, in many cases welders must make an effort when making changes in welding position to adapt the cable to new orientations or positions. In some cases the cable can become bent to an unacceptable degree, which can prevent the welding wire from being fed forward to the weld. This can cause the weld session to be broken which may cause the welder to start the weld over, again reducing efficiency.

Current solutions for wire feeder mobility are not user friendly because the machines are heavy and difficult to move with bodily force alone. In addition, to change settings the welder must walk back and forth to the wire feeder and power source, which is very time consuming and reduces efficiency.

Current solutions to the aforementioned problems include counterbalance masts, in which the wire feeder is attached to an arm placed on the power source. The arm can be rotated 180-degrees by the welder using body force. The arm of these counterbalance masts can lift some of the cable weight, but not all. In some cases the wire feeder is positioned on a boom. The boom is rotatable and the wire feeder is slidable on the boom. The sliding movement is controlled by the welder using body force. In yet other instances a small trolley can be used to support the wire feeder to increase movability and reach and to provide a bigger working space. With such arrangements, however, the welder must drag the wire feeder on the floor using bodily force. These arrangements do not address the issues caused by the cable weight.

None of the current solutions fully address the aforementioned issues caused by current cable and torch arrangements. Regarding the weight issue, current solutions are incapable of carrying the full weight of the cable. Instead, the welder must carry the weight of the portion of the cable connected to the torch. This portion has a tendency to get stuck or to snag on objects during welding. In addition, current counter balance masts are stiff and not very flexible and only rotate in the center; which limiting the welder's movements.

For solutions in which the wire feeder connected to a boom, or where the wire feeder is connected to a trolley, similar limitations exist. Moreover, with the trolley arrangement the wire feeder must be dragged along the floor using bodily force, and occasionally the trolley tilts over or gets stuck to other objects.

Thus, there is a need for an improved system for supporting welding cable, welding torch and wire feeder mechanisms that minimize force applied to the welder's body during welding operations, and that maintain those mechanisms in a compact arrangement to enhance safety and efficiency.

SUMMARY OF THE DISCLOSURE

An ergonomic welding arm includes a plurality of arm links coupled by a plurality of joints. Each of the plurality of joints is configured to allow the plurality of arm links to be rotated about an axis with respect to a directly adjacent arm link. A first end of the welding arm is configured to engage a support for supporting the welding arm. A second end of the welding arm is configured to engage a welding torch.

BRIEF DESCRIPTION OF THE DRAWINGS

By way of example, a specific embodiment of the disclosed device will now be described, with reference to the accompanying drawings, in which.

DETAILED DESCRIPTION

An ergonomic welding arm is disclosed for use with manual welding torches. The welding arm includes a plurality of joints configured to enable the arm to follow the welder's movements during welding operations. The welding cable and welding torch can be connected to the welding arm so that the welding arm will carry the entire weight of the welding cable and the torch. The welding cable and the welding arm can be hung from above the welder on a boom or other appropriate structure. The welding arm will be movable in all directions and can therefore be easy to use on both sides of an object being welded. In some embodiments the welding arm will have at least four separate joints to provide a desired range of movement. Thus arranged, the welding arm can follow the movements of the welder in a smooth manner without requiring the application of substantial body force and without the need for motorization. It will be appreciated, however, that motorization of individual joints may be used as desired.

The result is that weight applied to the welder is reduced, which in turn reduces welder fatigue. This reduced weight will also invite people who otherwise would not be physically able to manage current heavy welding cable arrangements. In addition, the disclosed arrangement facilitates a more time efficient welding arrangement in which the welding cable is unlikely to get stuck or snag during welding operations. In some instances the disclosed welding arm can include wire feeder and power settings positioned in an easily accessible manner so that the welder can change welding settings without having to walk back and forth to the wire feeder and/or power source.

Figure 1:
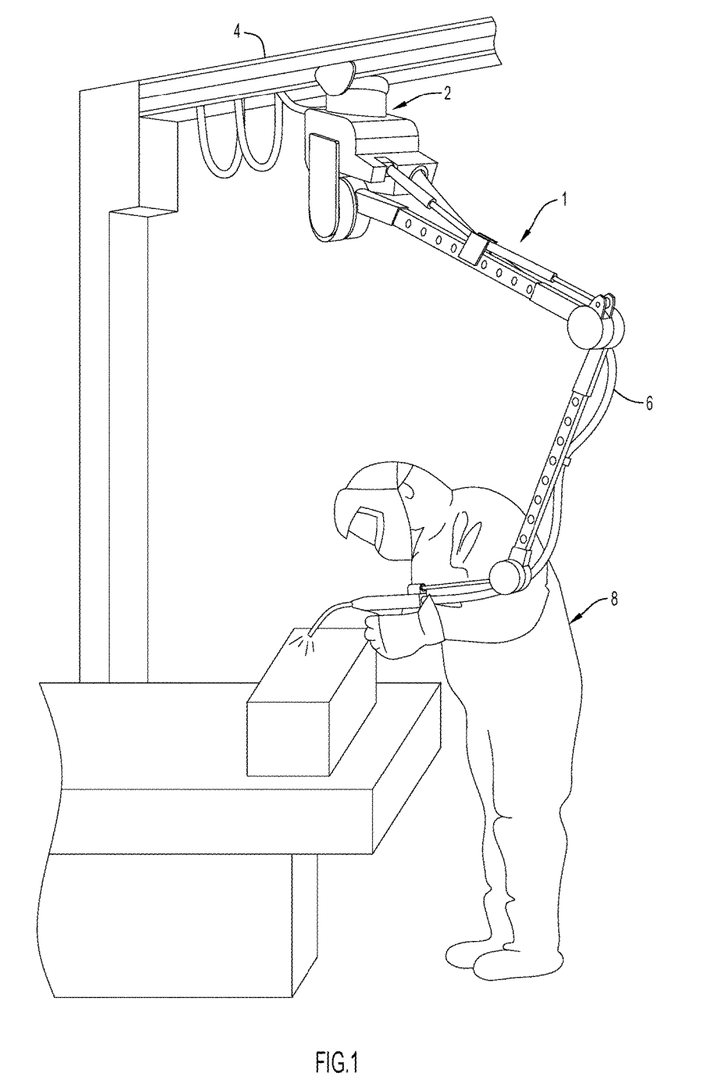
FIG. 1 is an isometric view of a welder using the disclosed welding arm.

Referring now to FIG. 1, the disclosed welding arm 1 is shown positioned over a welding area. In the illustrated embodiment the welding arm 1 is coupled at a distal end 2 to an overhead boom 4 to enable the welding arm to slide back and forth, thus maximizing the arm's area of reach. The welding arm 1 can have multiple degrees of freedom to enable it to be maximally flexible in multiple directions while still supporting the full weight of the welding cable 6.

Figure 2:
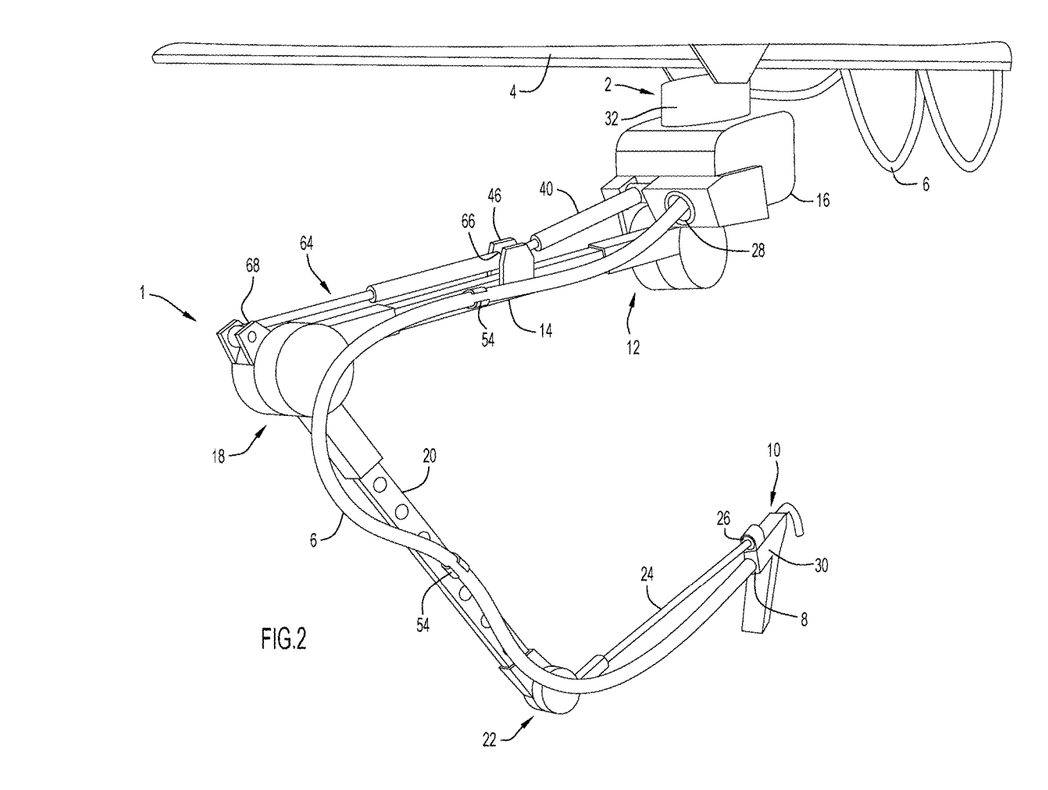
FIG. 2 is an isometric view of the welding arm of FIG. 1.
Figure 3:
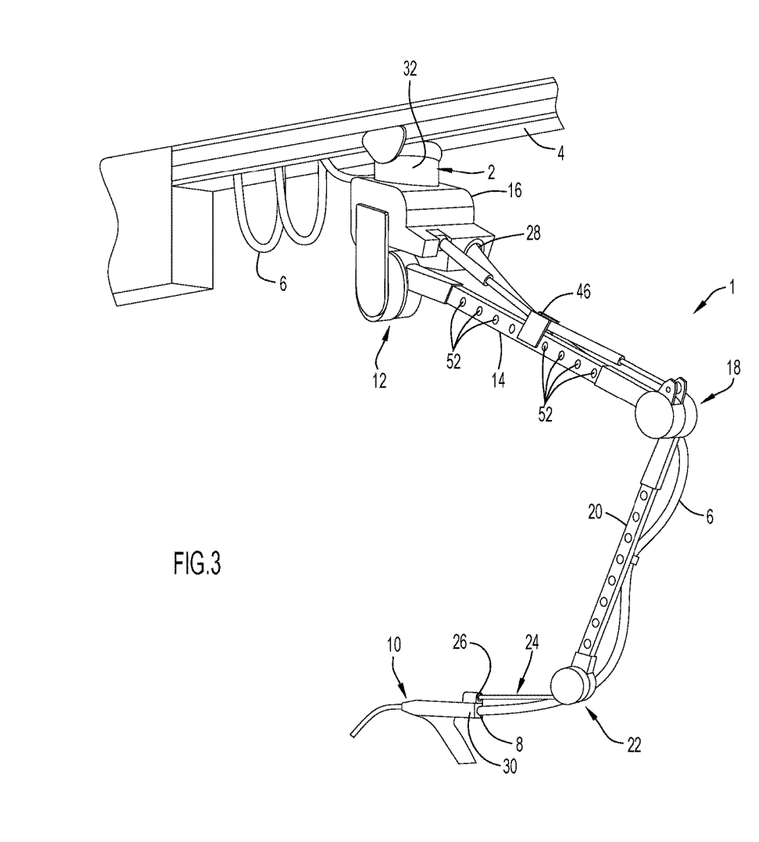
FIG. 3 is a reverse isometric view of the welding arm of FIG. 1.

FIGS. 2 and 3 show the welding arm 1 in greater detail. As noted, the welding arm 1 can be slidably coupled at a distal end 2 to an overhead boom 4. The welding arm 1 may be coupled at a proximal end 8 to a welding torch 10. The welding cable 6 may be supported by the welding arm 1 at multiple locations along the arm.

The welding arm 1 may include a plurality of joints for enabling a desired degree of adjustable movement so that the arm can easily track the welder's movements. In the illustrated embodiment the welding arm has four individual joints, though it will be appreciated that greater or fewer numbers of joints could also be used, as desired. The first joint 12 is positioned between a first arm link 14 and a wire feeder portion 16. The second joint 18 is positioned between the first arm link 14 and a second arm link 20. The third joint 22 is positioned between the second arm link 20 and a third arm link 24. The third arm link 24 is coupled to the welding torch 10 via a fourth joint 26. As will be described in greater detail later, the welding cable 6 is coupled at a first end 28 to the wire feeder portion 16 and is coupled at a second end 30 to the welding torch 10. The welding cable 6 is removably connected to the first and second arm links 14, 20 so that it generally follows the lines of the first, second and third arm links 14, 20, 24 between the wire feeder portion 16 and the welding torch 10.

The wire feeder portion 16 may be rotatably coupled to a cylinder 32 which itself is slidably coupled to the overhead boom 4. Thus arranged, the welding arm 1 (including the wire feeder portion 16) can be rotated about the longitudinal axis of the cylinder 32 to provide an additional degree of freedom for the welding arm. As will be appreciated, the wire feeder portion 16 may have some or all of the components required to feed welding wire through the welding cable 6 to the torch 10.

Figure 4:
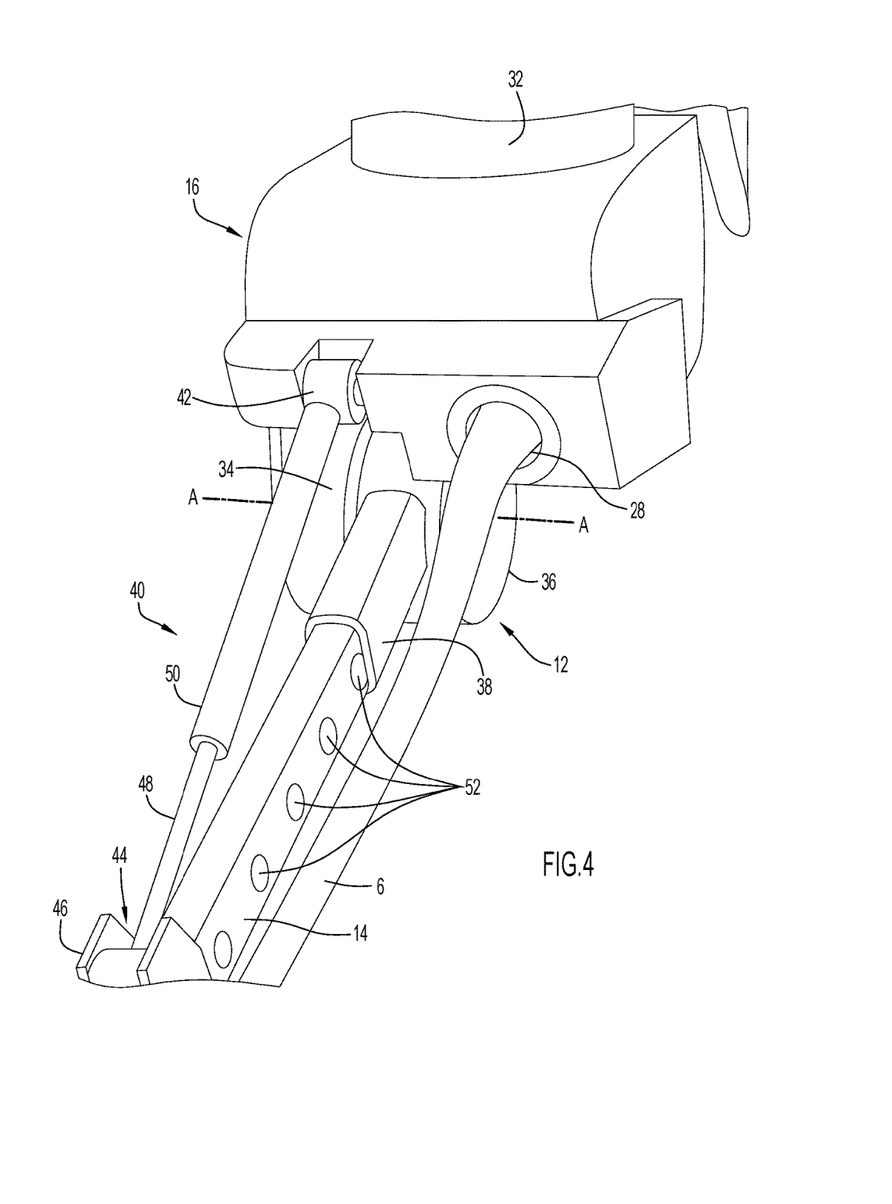
FIGS. 4-7 are detail isometric views of respective portions of the welding arm of FIG. 1.
Figure 5:
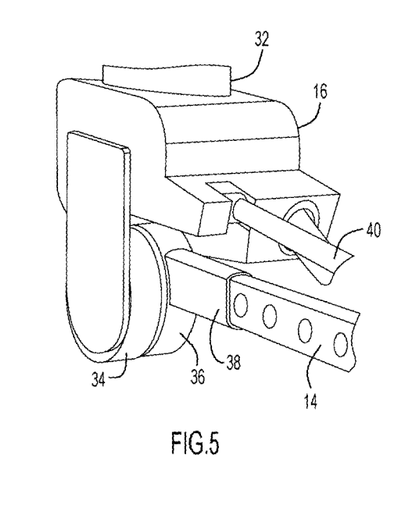

Referring to FIGS. 4 and 5, the first joint 12 is shown in greater detail. The first joint 12 has a first section 34 connected to the wire feeder portion 16 and a second section 36 connected to the first arm link 14. The first and second sections 34, 36 may be rotatable with respect to each other about a first axis A-A to enable the welding arm 1 to rotate with respect to the wire feeder portion 16 about the first axis. The first arm link 14 may be received within a sleeve portion 38 of the second section 36 of the first joint 12.

A first support arm 40 may be connected at a first end 42 to the wire feeder portion 16 and at a second end 44 to the first arm link 14. In the illustrated embodiment the second end 44 is connected to a mid-point of the first arm link 14 via a clip 46. The connection between the first end 42 and the wire feeder portion 16 may be a hinged connection to accommodate movement of the first arm link 14 about the first joint 12. Likewise, the connection between the second end 44 of the first support arm 40 and the clip 46 may also be a hinged connection to accommodate movement of the first arm link 14 about the first joint 12. The first support arm 40 may be a hydraulic or pneumatic arm having a piston portion 48 received within a housing portion 50. Such an arrangement enables the welding arm 1 to maintain a desired position while supporting the welding cable 6 and the welding torch 10 with little or no impact on the welder.

As can be seen, the first arm link 14 includes a plurality of through-holes 52 positioned at spaced-apart intervals along its length. These through-holes enable the clip 46 to be positioned at any of a variety of desired positions along the length of the first arm link, to enable the balance of the welding arm 1 to be fine-tuned. These through-holes also can receive one or more cable clips 54 (see FIG. 2) that can be used to secure the welding cable 6 to the welding arm 1 at a plurality of locations. Similar through-holes are provided in the second arm link 20 to enable the welding cable 6 to be secured to the second arm link.

Figure 6:
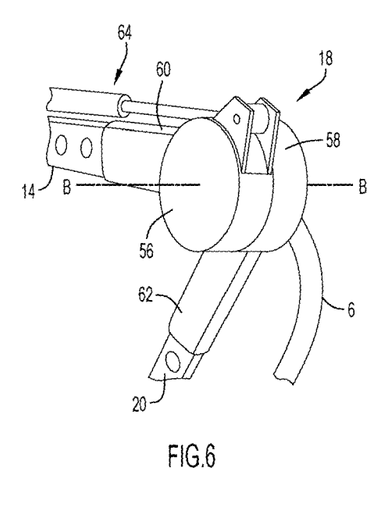

FIG. 6 shows the second joint 18 in greater detail. The second joint 18 has a first section 56 connected to the first arm link 14 and a second section 58 connected to the second arm link 20. The first and second sections 56, 58 may be rotatable with respect to each other about a second axis B-B to enable the first and second arm links 14, 20 to rotate with respect to each other about the second axis. The first and second arm links 14, 20 may be received within respective sleeve portions 60, 62 of the first and second sections 56, 58 of the second joint 18.

A second support arm 64 may be connected at a first end 66 to the clip 46 positioned on the first arm link 14, and at a second end 68 to the second section 58 of the second joint 18. These connections may be hinged to accommodate movement of the first and second arm links 14, 20 with respect to each other about the second joint 18. The second support arm 64 may be a hydraulic or pneumatic arm having the same or similar features and functionality as that described in relation to the first support arm 40.

Figure 7:
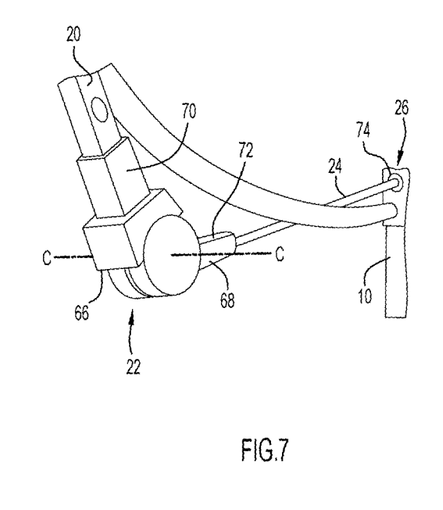

FIG. 7 shows the third joint 22 in greater detail. The third joint 22 may be similar to the first and second joints in that it has a first section 66 connected to the second arm link 20 and a second section 68 connected to the third arm link 24. The first and second sections 66, 68 may be rotatable with respect to each other about a third axis C-C to enable the second and third arm links 20, 24 to rotate with respect to each other about the third axis. The second and third arm links 20, 24 may be received within respective sleeve portions 70, 72 of the first and second sections 66, 68 of the third joint 22.

The fourth joint 26 is also visible in FIG. 7. The fourth joint 26 may be a ball joint in which a ball element 74 is received in a correspondingly shaped recess in the welding torch 10. The third arm link 24 is a thin rod or pipe element that is connected to the ball element 74 so that the torch 10 is rotatable about the ball element. This arrangement gives the welder the opportunity to leave the torch 10 in the air. The torch 10 is easily accessible to "grab-and-weld."

It is desirable that the parts closest to the welder should have the greatest amount of movement freedom. The fourth joint 26 is therefore configured such that they can follow small movements of the torch 10. As such it is rotatable in two directions, and is as movable as a ball joint.

Figure 8:
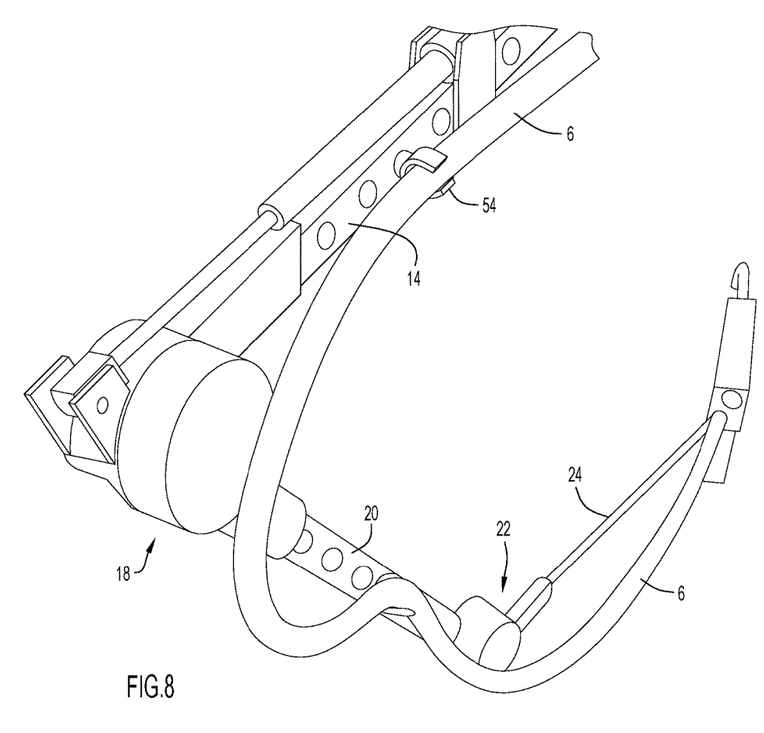
FIG. 8 is an isometric view of the welding arm of FIG. 1 showing a cable attachment feature.

FIG. 8 shows the positioning of the welding cable 6 with respect to the first, second and third arm links 14, 20, 24. As can be seen, the welding cable 6 is positioned outside of the arm links instead of on the inside. The benefit of this arrangement is that it makes the cable easy to change if it breaks or requires replacement for any other reason. It also provides an advantage when changing the welding wire, as the welding cable needs to be as straight as possible during such a procedure. With the disclosed design it is possible simply to remove the cable from the clips 54 to straighten it. In addition, by keeping the welding cable 6 on the outside of the arm links, the profiles used to form the links can be easily cut to lengths suitable for the welding station and length of the welders.

Figure 9:
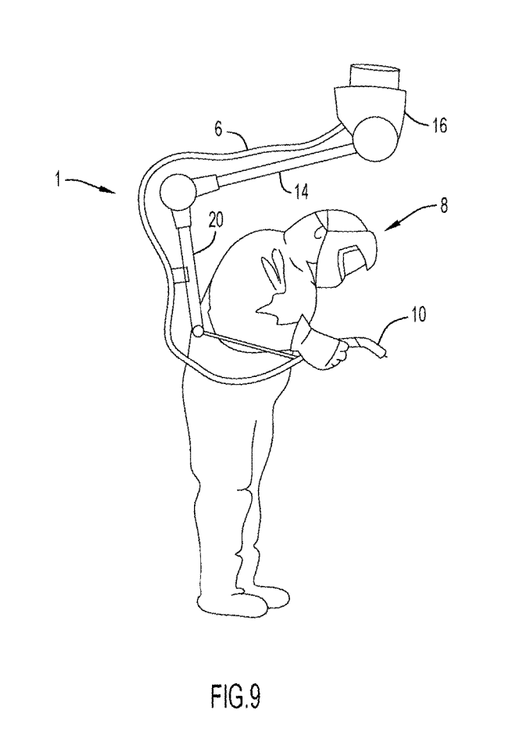
FIGS. 9 and 10 are illustrations of a welder using the welding arm of FIG. 1 in exemplary first and second positions.
Figure 10:
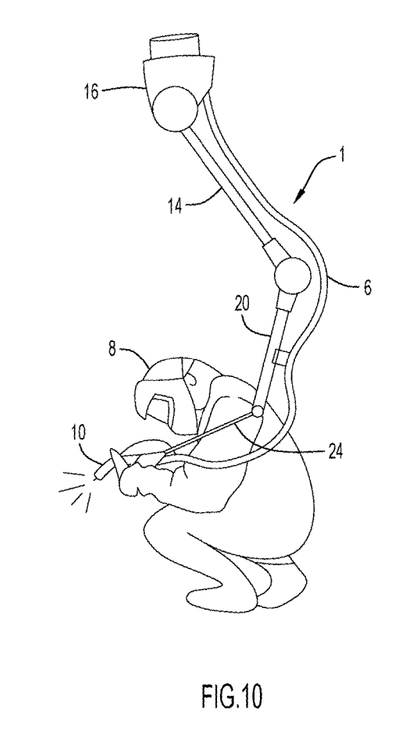

FIGS. 9 and 10 show a pair of exemplary positionings of the disclosed welding arm 1 to accommodate a welder 8 who is standing (FIG. 9) and a welder who is bending down (FIG. 10) to weld in a floor-level location. As can be seen, the welding arm 1 is rotatable about the all of the joints to automatically accommodate the welder's movement pattern. Though not shown in this view, the wire feeder portion 16 would be slidable along the boom 4 in the manner previously described.

Thus arranged, the disclosed welding arm 1 is movable in all directions, and can carry the full weight of the welding cable 6 while being hung from above. As will be appreciated, prior arrangements required the welder to carry the weight of the cable, which not only causes fatigue to the body but can also create trembling during the welding session resulting in a joint of lower quality. By lifting the whole weight of the cable, the fatigue of the body and the trembling can be minimized if not eliminated.

With prior arrangements the cable would frequently get stuck, requiring the welder to move the cable around between each session of active arc time, which in some cases only lasts on the order of a couple of seconds. Therefore, the movement pattern of current welding equipment is; weld, move cable, adjust torch, weld, move cable, adjust torch etc. If the cable becomes stuck in the middle of a welding session the joint is destroyed and the welder must to start again, which is time consuming. The disclosed welding arm 1 will decrease the number of movements per welding session, since the welding arm lists the cable up away from the welding station, preventing it from getting stuck or snagged. The resulting movement pattern of the welder will include fewer steps: (e.g., weld, move, weld, move).

The welding arm 1 may include a variety of additional features. For example, one or more of the joints of the welding arm may have static and/or adjustable spring loads to compensate for different cable and/or torch weights. Alternatively, or in addition, one or more of the joints could have powered weight compensation, lockable joints, ball joints, air powered suspension joint and/or a force feedback system.

The welding arm 1 may also include magnetic field shielding to protect the welder from long term exposure to the magnetic field created by the welding cable during welding.

Where the welding arm 1 includes powered weight compensation it could be configured to function as a lifting device for lifting welded parts, tools, components and the like.

The welding arm 1 can be configured as a core module for cable hanging, fume extraction, remote control, light, compressed air and/or peripherals such as changeable torch necks, other accessories to the torch, cup holder and/or personal accessories.

The welding arm 1 can include target lighting such as a lamp, and/or a laser for identifying a correct welding speed. A camera can be provided for recording weld quality or for obtaining augmented reality images of the welding area or for collecting heat information (using an infrared camera) regarding the weld.

Although the welding arm 1 is disclosed as being hung from a boom 4, it will be appreciated that it could alternatively be supported on a mobile foot and/or connected to a power source trolley.

In some embodiments the individual arm links could comprise parallelograms with tension and/or compression springs. In addition, the welding arm 1 could include built-in stabilization to eliminate welding errors due to unsteady hands.

The welding arm 1 can also be used to collect data such as welding speed by measuring the speed of the torch 10. Feedback could then be provided to the welder when the arm senses that welding speed is outside established limits. The arm could also be programmable so that predefined movement patterns can be programmed into the arm (via a suitable processor, memory and motion control mechanisms). By providing direction and speed information to the arm, the arm can perform the movement to achieve a desired weld.

In addition, small desk-sized versions of the disclosed welding arm 1 are contemplated for applications such as precise TIG welding.

Advantages of Disclosed Welding Arm

The disclosed welding arm 1 will support the entire weight of the welding cable 6 and torch 10, as opposed to current solutions that lift merely a portion of the weight.

The disclosed welding arm 1 will, owing to its ability to follow the welder's movements, decrease the static load to the welder's wrists, shoulders and back.

The portion of the welding cable 6 adjacent the welding torch 10 will not be in the way nor will it get stuck to or snagged on other objects or due to friction, as there will be no part of the cable hanging loose.

The disclosed welding arm 1 can be provided in modules so that it can be easily fit to different welding station measurements. For example, the lengths of the individual arm links are adjustable, allowing the arm to be easily adapted to a particular work space.

The disclosed welding arm 1 can be easily rotated to reach the whole work table/work space. This can eliminate the current practice of throwing the cable to reach another side of the work space (or even requiring an additional welding machine on a far side of the welding area) as occurs with many current solutions.

The disclosed welding arm 1 makes it easy to leave the torch 10 and the arm "in the air" above the working space rather than hanging the torch and cable on another item. This enables the welder to keep the welding torch close to the working space and eliminates the time consuming issue of walking back and forth to get the torch.

The disclosed welding arm 1 eliminates the time consuming process of adapting/reconfiguring the welding cable between each and every welding session.

The disclosed welding arm 1 can be fit to existing welding torch and/or wire feeder designs, or it can be used with customized new torch and/or wire feeder designs.

Depending on the application the arm links and joints can be made from metal (e.g., aluminum) or plastic.

Based on the foregoing information, it will be readily understood by those persons skilled in the art that the invention is susceptible of broad utility and application. Many embodiments and adaptations of the invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the invention or otherwise exclude any such other embodiments, adaptations, variations, modifications or equivalent arrangements; the invention being limited only by the claims appended hereto and the equivalents thereof. Although specific terms are employed herein, they are used in a generic and descriptive sense only and not for the purpose of limitation.

What is claimed is:

1. An ergonomic welding arm, comprising:
   a wire feeder portion;
   a plurality of arm links coupled by a plurality of joints, each of the plurality of joints configured to allow the plurality of arm links to be rotated about an axis with respect to a directly adjacent arm link, wherein:
      a distal end of the ergonomic welding arm is coupled, via the wire feeder portion, to a support for supporting the ergonomic welding arm;
      a proximal end of the ergonomic welding arm is configured to engage a welding torch; and
      a first arm link and a second arm link of the plurality of arm links include a plurality of holes positioned at spaced-apart intervals; and
   a welding cable that is coupled to the wire feeder portion and the welding torch, and removably connected, by a plurality of clips, to an exterior of at least the first arm link and the second arm link so that the welding cable generally follows the plurality of arm links between the wire feeder portion and the welding torch, wherein each hole of the plurality of holes is configured to receive one or more of the plurality of clips so that the plurality of clips is positioned in a plurality of locations along the first arm link and the second arm link.

2. The ergonomic welding arm of claim 1, wherein the wire feeder portion is coupled to the first arm link via a first joint of the plurality of joints.

3. The ergonomic welding arm of claim 1, wherein the support is a cylindrical support, the wire feeder portion is rotatably coupled to the cylindrical support, and the cylindrical support is configured to slidably engage an overhead boom for supporting the ergonomic welding arm.

4. The ergonomic welding arm of claim 1, further comprising:
   a first support arm coupled between the wire feeder portion and a middle portion of the first arm link, the first support arm comprising a hydraulic cylinder.

5. The ergonomic welding arm of claim 4, further comprising a second support arm coupled between the middle portion of the first arm link and a second joint of the plurality of joints.

6. The ergonomic welding arm of claim 1, wherein the proximal end of the ergonomic welding arm engages the welding torch via a ball joint.

7. The ergonomic welding arm of claim 1, further comprising a control positioned adjacent to the welding torch, the control for adjusting a wire feeding parameter.

8. The ergonomic welding arm of claim 1, further comprising a control positioned adjacent to the welding torch, the control for adjusting power of an associated welding power source.

9. The ergonomic welding arm of claim 1, wherein the welding cable is removable from the plurality of clips for replacement of the welding cable or for replacement of a welding wire passing through the welding cable.

10. An ergonomic welding arm, comprising:
    a distal end of the ergonomic welding arm coupled to a support for supporting the ergonomic welding arm;
    a proximal end of the ergonomic welding arm configured to engage a welding torch;
    a first arm link and a second arm link coupled together by a joint that allows the first arm link and the second arm link to rotate about an axis with respect to each other, wherein the first arm link and the second arm link each include a plurality of holes positioned at spaced-apart intervals; and
    a welding cable that is coupled to the distal end of the ergonomic welding arm and the proximal end of the ergonomic welding arm, and removably coupled, by a plurality of clips, to an exterior of the first arm link and the second arm link so that the welding cable generally follows the first arm link and the second arm link between the distal end and the proximate end, wherein each hole of the plurality of holes is configured to receive one or more of the plurality of clips so that the plurality of clips is positioned in a plurality of locations along the first arm link and the second arm link.

11. The ergonomic welding arm of claim 10, wherein the distal end of the ergonomic welding arm is coupled to the support via a wire feeder portion, and the welding cable extends from the wire feeder portion to the welding torch.

12. The ergonomic welding arm of claim 11, wherein the wire feeder portion is coupled to the first arm link via a first joint that allows rotation of the first arm link about an axis with respect to the wire feeder portion.

13. The ergonomic welding arm of claim 11, wherein the support is a cylindrical support, the wire feeder portion is rotatably coupled to the cylindrical support, and the cylindrical support is configured to slidably engage an overhead boom for supporting the ergonomic welding arm.

14. The ergonomic welding arm of claim 10, further comprising:
    a first support arm coupled between the distal end of the ergonomic welding arm and a middle portion of the first arm link, the first support arm comprising a hydraulic cylinder.

15. The ergonomic welding arm of claim 14, further comprising a second support arm coupled between the middle portion of the first arm link and the joint.

16. The ergonomic welding arm of claim 10, wherein the proximal end of the ergonomic welding arm engages the welding torch via a ball joint.

17. The ergonomic welding arm of claim 10, further comprising a control positioned adjacent to the welding torch, the control for adjusting a wire feeding parameter.

18. The ergonomic welding arm of claim 10, further comprising a control positioned adjacent to the welding torch, the control for adjusting power of an associated welding power source.

19. The ergonomic welding arm of claim 10, wherein the welding cable is removable from the plurality of clips for replacement of the welding cable or for replacement of a welding wire passing through the welding cable.

* * * * *